United States Patent
Wells et al.

Patent Number: 5,207,281
Date of Patent: May 4, 1993

[54] DRILL RATE CALCULATOR

[76] Inventors: Deborah G. Wells, 802 B Harbourtown Ct., Noblesville, Ind. 46060; Ted L. Salsbery, Rte. 1, Box 181, Sharpsville, Ind. 46068

[21] Appl. No.: 826,917

[22] Filed: Mar. 9, 1992

[51] Int. Cl.⁵ .............................. E12B 17/00
[52] U.S. Cl. ........................................ 175/27
[58] Field of Search ...................... 175/27, 45, 40

[56] References Cited

U.S. PATENT DOCUMENTS 3,870,111  3/1975  Tuomela et al. ............... 175/27 X
3,891,038  6/1975  Delestrade et al. ............ 175/27 X Primary Examiner—Thuy M. Bui

[57] ABSTRACT

The drill rate calculator is used to test seeds per acre population settings for agricultural grain drills. The improvement is comprised of five parts. The two positioning springs are attached to the seed metering cup mounting bolts, and generally are not removed after completed tests. The base cone, which has detents on each side for positioning, confines measured seed to a particular seed metering cup. The seed measuring tube has predetermined seed measuring lines strategically located above a base line from which all measurements begin and test results are determined. A top funnel is used to assist in filling.

1 Claim, 4 Drawing Sheets

DRILL RATE CALCULATOR

FIELD OF INVENTION

Our invention relates to measuring seeding rates for agricultural grain drills in terms of seeds per acre as opposed to pounds per acre.

DESCRIPTION OF THE PRIOR ART

Agricultural grain drills use a variety of seed metering systems such as fluted feed cups and double run systems. These systems, as with all others, have variable settings to allow for increases and decreases in seed planting populations. Manufacturers provide charts with grain drills to assist the operator in setting the drill for specified pounds per acre seeding rates. Different varieties of seeds, however, can vary in size as much as one thousand five hundred seeds per pound. For greater accuracy, seed companies recommend that population be determined by seeds per acre, regardless of seed size. Generally, the industry is in agreement with this concept.

Presently, to attain the recommended accuracy of seed population, the operator should complete several steps to determine the correct setting of the drill. This includes but is not limited to the following: remove one of the seed delivery tubes; place a container under the metering cup to collect seeds; jack the drill up to free the drive wheel of any obstructions; determine the correct measuring distance; turn the drive wheel the number of revolutions times the wheel circumference equal to the test distance; count the seeds from the collection container and divide by the test distance to determine seeds per foot; multiply times feet per acre to find seeds per acre; after test, reinstall all drill parts. This process is common among all drills and crops planted with those drills.

SUMMARY OF THE INVENTION

Our invention provides drill operators with a device to measure seeding rates quickly, accurately, and without removal of drill components. The positioning springs mount on the drill with the seed cup mounting bolts and remain there. Our calculator sits atop the seed cup and is held in place by the positioning springs. The calculator should be removed after each test. The accompanying chart shows the operator the recommended test drilling distances for various seed sizes, row widths, and desired populations.

DETAILED DESCRIPTION

Figure 2:
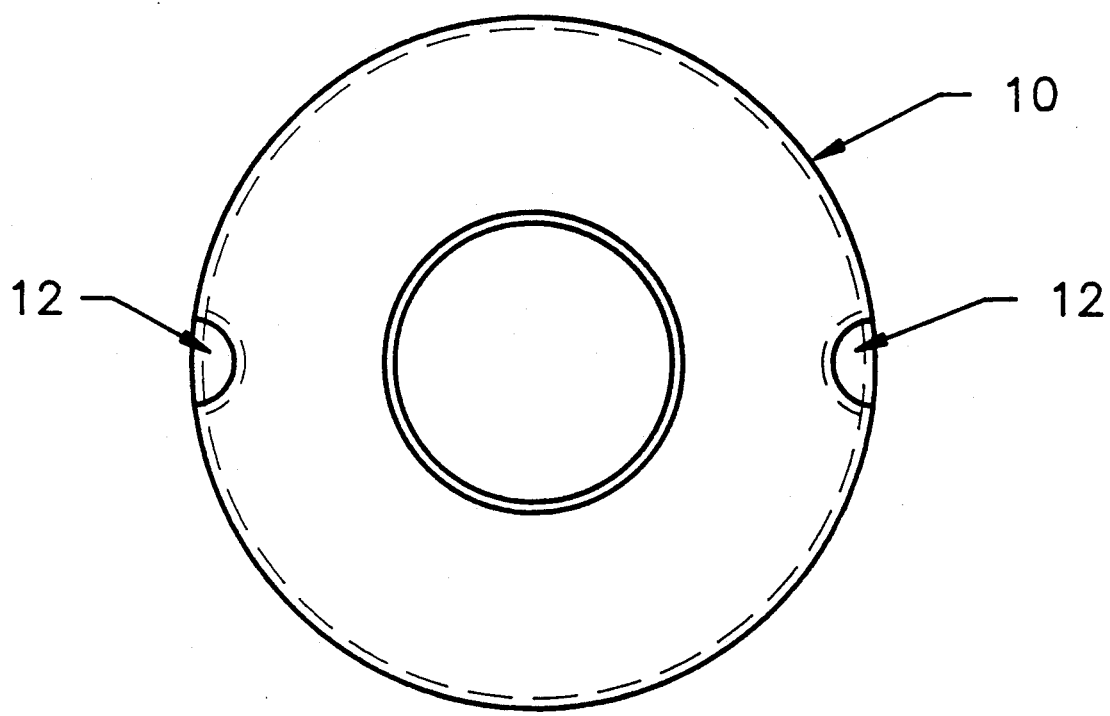
FIG. 2 is a top view of the base cone showing the detent areas.
Figure 1:
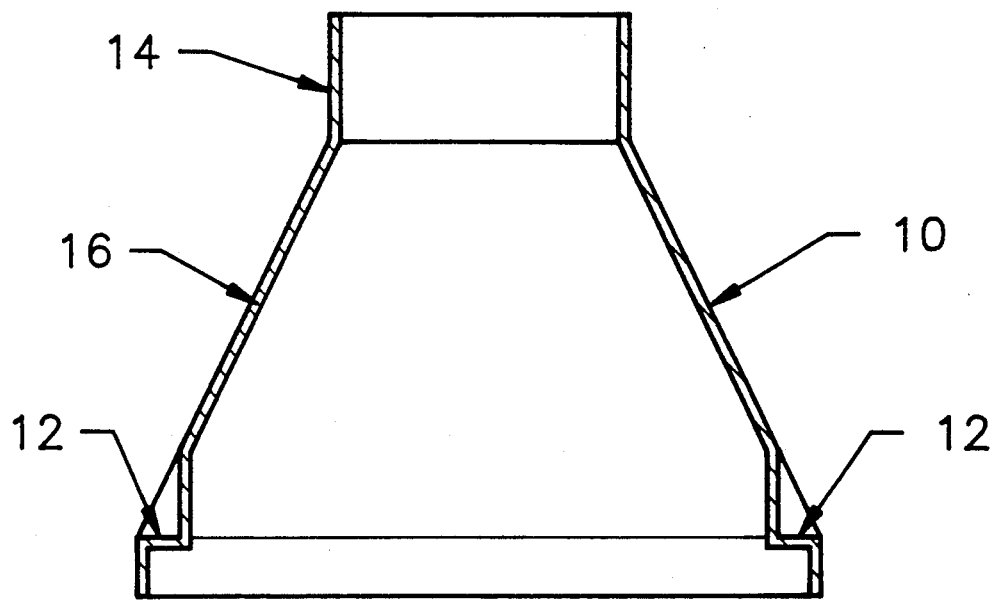
FIG. 1 is a cross section side view of the base cone.

The drill rate calculator consists of four parts. FIG. 1 shows a cross section side view of the base cone designated 10. The base cone 10 is designed to cover the access opening to the seed cup of a grain drill. The base 10 is 4 inches in diameter at the bottom. There are two detent areas 12 on the base 10 to accept a positioning spring probe 41 FIG. 6. The side wall 16 of the base cone 10 is at a 65 degree angle to prevent air pockets in seed flow. The neck 14 of the base 10 tapers in at a 1 degree angle to assure a tight fit of the measuring tube 30. FIG. 2 shows a top view of the base cone 10. The detent areas 12 extend 0.5 inches in from the edge of the base 10, and have a five eighths inch radius.

Figure 3B:
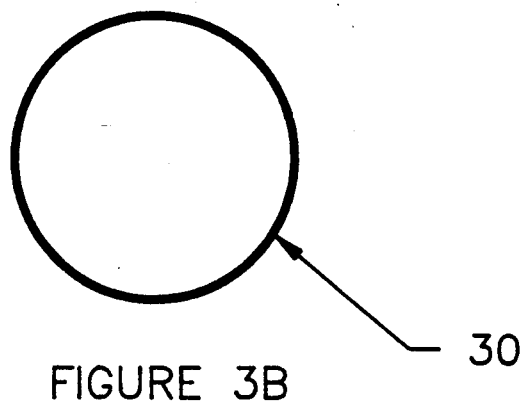
FIGS. 3A and 3B show the seed measuring tube.
Figure 3A:
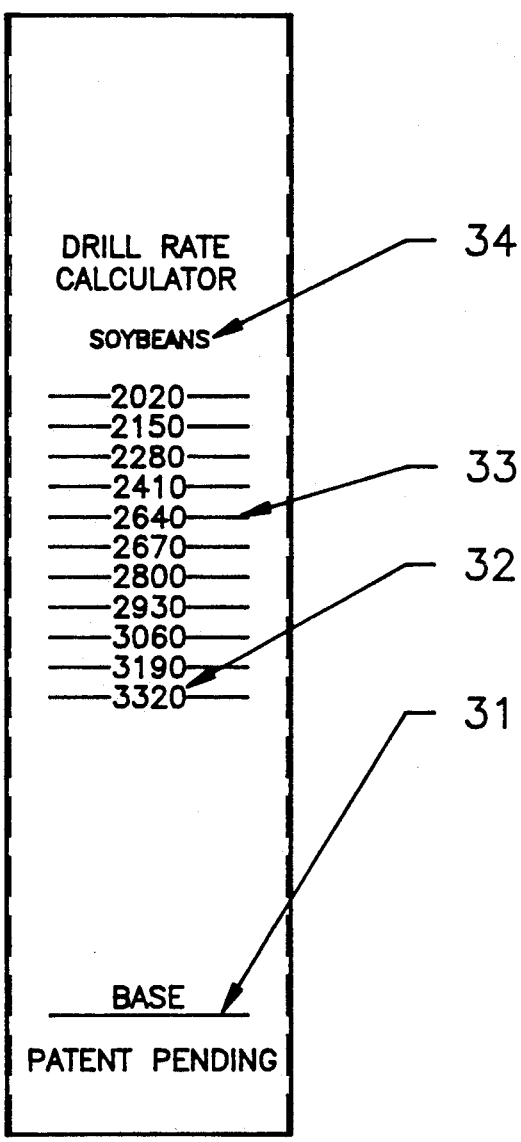

FIG. 3 is the measuring tube designated 30. The measuring tube 30 is one and seven eighths inches in diameter and seven inches in height. One inch from the bottom of the measuring tube 30 is the base line 31 for seed size measuring. The 11 sets of numbers 32 in the center of the tube 30 represent various seed sizes designating the number of seeds per pound. The lines 33 extending out from the sizing numbers 32 represent the filling level for their respective seed sizes. The word soybeans 34 indicates that this tube 30 is for soybeans only and any other crop requires a different tube 30, measuring lines 33, and numbers 32.

Figure 5:
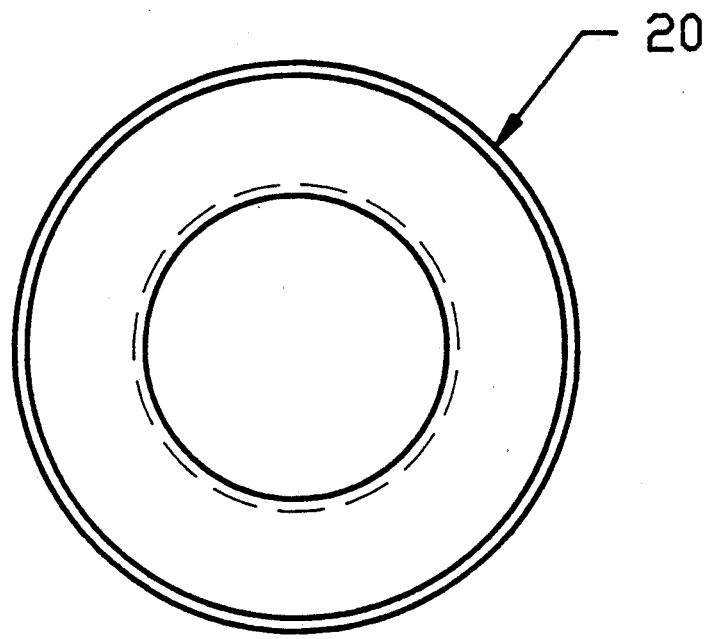
FIG. 5 is a top view of the top funnel.
Figure 4:
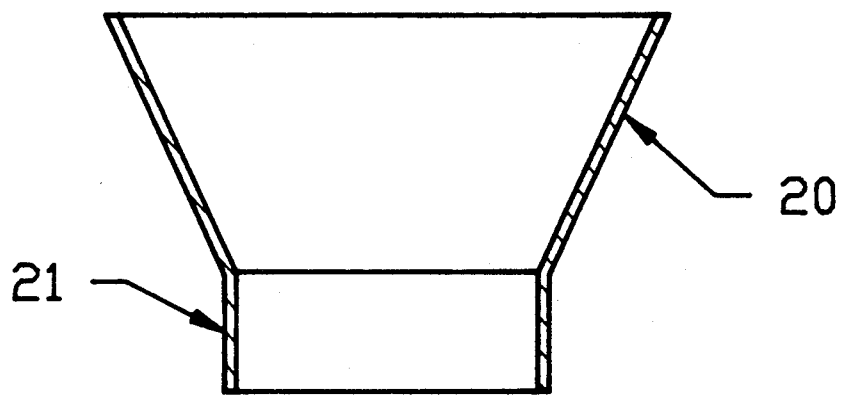
FIG. 4 is a cross section side view of the top funnel.
Figure 7:
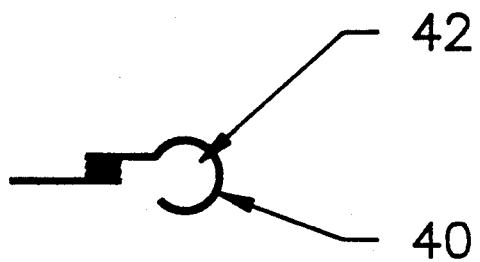
FIG. 7 is a top view of the positioning spring.

FIG. 4 is a cross section side view of the top funnel 20. The bottom wall 21 of the funnel 20 is at a 1 degree angle to assure a tight fit into the tube 30. FIG. 5 is a top view of the funnel 20.

Figure 6:
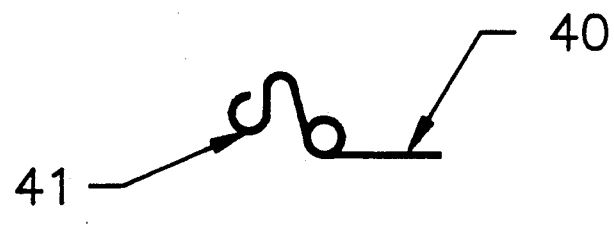
FIG. 6 is a side view of the positioning spring.

FIG. 6 is a side view of the positioning spring 40. The inner node 41 of the positioning spring 40 applies pressure to the detent area 12 of the base cone 10. The outer loop 42 of the positioning spring 40 fits over the seed cup attaching bolt to secure the positioning spring 40.

The operators manual for the calculator lists most if not all of the recommended population settings, the most popular drill row widths, estimated drill settings by pounds per acre, and the actual test distances required for testing population settings for various drills.

We claim:

1. A grain drill seeding rate indicator comprised of:
    a base having a cone shape measuring four inches at the bottom, with two detents measuring one half inch in diameter located three sixteenths inch up from the bottom of said base one hundred eighty degrees apart
    a clear propionate tube one and seven eighth inches in diameter by seven inches tall positioned on said base
    a line on said tube using a silk screen process indicating the starting point for seed measurement
    seed size measuring numbers printed on said tube using a silk screen process
    a funnel placed on top of said tube
    a pair of detent positioning springs with a closed loop on an outer end for drill attachment.

* * * * *